(12) United States Patent
Umegaki et al.

(10) Patent No.: US 9,802,560 B2
(45) Date of Patent: Oct. 31, 2017

(54) ELECTRONIC CIRCUIT

(71) Applicant: DENSO CORPORATION, Kariya, Aichi-pref. (JP)

(72) Inventors: Nobuo Umegaki, Chiryu (JP); Susumu Tsuruta, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 255 days.

(21) Appl. No.: 14/442,044

(22) PCT Filed: Oct. 24, 2013

(86) PCT No.: PCT/JP2013/006300
§ 371 (c)(1),
(2) Date: May 11, 2015

(87) PCT Pub. No.: WO2014/076889
PCT Pub. Date: May 22, 2014

(65) Prior Publication Data
US 2015/0291110 A1    Oct. 15, 2015

(30) Foreign Application Priority Data

Nov. 13, 2012 (JP) ................................ 2012-248884

(51) Int. Cl.
*B60R 25/00* (2013.01)
*H01H 47/22* (2006.01)
(Continued)

(52) U.S. Cl.
CPC .......... *B60R 16/03* (2013.01); *B60R 25/0215* (2013.01); *B60R 25/02142* (2013.01); *B60R 25/40* (2013.01)

(58) Field of Classification Search
CPC .............. B60R 16/03; B60R 25/02142; B60R 25/0215
(Continued)

(56) References Cited

U.S. PATENT DOCUMENTS 8,554,413 B2    10/2013    Mukai et al.

FOREIGN PATENT DOCUMENTS

| JP | H07117624 A | 5/1995 |
| JP | 2012137716 A | 7/2012 |

OTHER PUBLICATIONS

International Search Report and Written Opinion (in Japanese with English Translation) for PCT/JP2013/006300, dated Jan. 7, 2014; ISA/JP.

*Primary Examiner* — Rexford Barnie
*Assistant Examiner* — Toan Vu
(74) *Attorney, Agent, or Firm* — Harness, Dickey & Pierce, P.L.C.

(57) ABSTRACT

An electronic circuit includes a regulator circuit including at least one regulator configured to supply a predetermined voltage by receiving a power supply from a main power source circuit, a functional circuit configured to operate on the voltage supplied from the regulator and perform a predetermined function, and a monitor circuit connected to at least one of the regulators and configured to monitor operation mode information inputted to the regulator. When detecting that the operation mode information contains sleep transition information to make a transition from a normal mode as a normal operation state to a sleep mode as an operation state where power consumption is smaller than that in the normal mode, the monitor circuit outputs a voltage output maintaining signal to the regulator connected to the monitor circuit to supply the voltage capable of causing the functional circuit to operate in the normal mode.

2 Claims, 5 Drawing Sheets

(51) Int. Cl.
    *B60R 16/03*         (2006.01)
    *B60R 25/0215*    (2013.01)
    *B60R 25/40*       (2013.01)
    *B60R 25/021*     (2013.01)

(58) Field of Classification Search
    USPC .................................................. 307/10.2
    See application file for complete search history.

ELECTRONIC CIRCUIT

CROSS REFERENCE TO RELATED APPLICATIONS

This application is a U.S. National Phase Application under 35 U.S.C. 371 of International Application No. PCT/JP2013/006300 filed on Oct. 24, 2013 and published in Japanese as WO 2014/076889 A1 on May 22, 2014. This disclosure is based on and claims the benefit of priority from Japanese Patent Application No. 2012-248884 filed on Nov. 13, 2012. The entire disclosures of all of the above applications are incorporated herein by reference.

TECHNICAL FIELD

The present disclosure relates to an electronic circuit.

BACKGROUND ART

A vehicular steering locking device to protect a vehicle from theft is known (refer to a patent literature 1). In this vehicular steering locking device, when a biasing force of a coil spring is applied to a lock bar so that its tip can be fitted into a lock hole formed in a middle of an outer wall of a steering shaft coupled to a steering wheel, the steering shaft is put in a locked state. On the other hand, when an electromagnetic solenoid is energized by a battery to put the steering shaft in an unlocked state, the lock bar is pulled against the coil spring, and its tip is released from the lock hole.

Locking a steering against user's will while a vehicle is moving should be avoided because it has a severe influence on a "turn" which is one of basic functions of a vehicle. For this reason, a mechanism, such as an assist function to be activated when a vehicular steering locking device is operated, to prevent a transition to a user's unintended state is proposed.

PRIOR ART LITERATURES

Patent Literature

Patent Literature 1: JP H07-117624A

SUMMARY OF INVENTION

Conventional steering lock control determines whether a locking is allowed or prohibited based on a vehicle state (input information including shift position, vehicle speed, and steering position) while ensuring safety. The control is made so that only when a looking enable condition is satisfied, a transition to a steering locking enable state can occur. Although this control can be implemented by a discrete circuit, it is generally implemented by a logic IC.

There is no problem in a wake-up mode where a logic IC operates normally. However, it is impossible to accurately determine whether the locking is allowed or prohibited when the vehicle state changes during a transition from a sleep mode as a power-saving operation mode to the weak-up mode. A reason for this is that the logic IC needs a time for power supply stabilization and refresh (e.g., initialization) during the transition from the sleep mode to the weak-up mode. For this reason, during the time, the vehicle state may not be obtained, so that accurate determination may not be made (a reduction in responsivity with respect to the vehicle state).

In view of the above, it is an object of the present disclosure to provide an electronic circuit capable of ensuring responsivity with respect to a process for an external state regardless of a state of peripheral circuitry of the electronic circuit without an increase in cost.

According to an aspect of the present disclosure, an electronic circuit includes a regulator circuit including at least one regulator configured to supply a predetermined voltage by receiving a power supply from a main power source circuit, a functional circuit configured to operate on the voltage supplied from the regulator and perform a predetermined function, and a monitor circuit connected to at least one of the regulators and configured to monitor operation mode information inputted to the regulator. When detecting that the operation mode information contains sleep transition information to make a transition from a normal mode as a normal operation state to a sleep mode as an operation state where power consumption is smaller than that in the normal mode, the monitor circuit outputs a voltage output maintaining signal to the regulator connected to the monitor circuit to supply the voltage capable of causing the functional circuit to operate in the normal mode.

By adding a function to retain an internal power source to the functional circuit in this way, the responsivity with respect to the process for the external state can be ensured. Thus, since the power source of the functional circuit is retained even during a transition of the electronic circuit from the sleep mode to the normal mode, the process for the external state can be adequately performed.

BRIEF DESCRIPTION OF THE DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
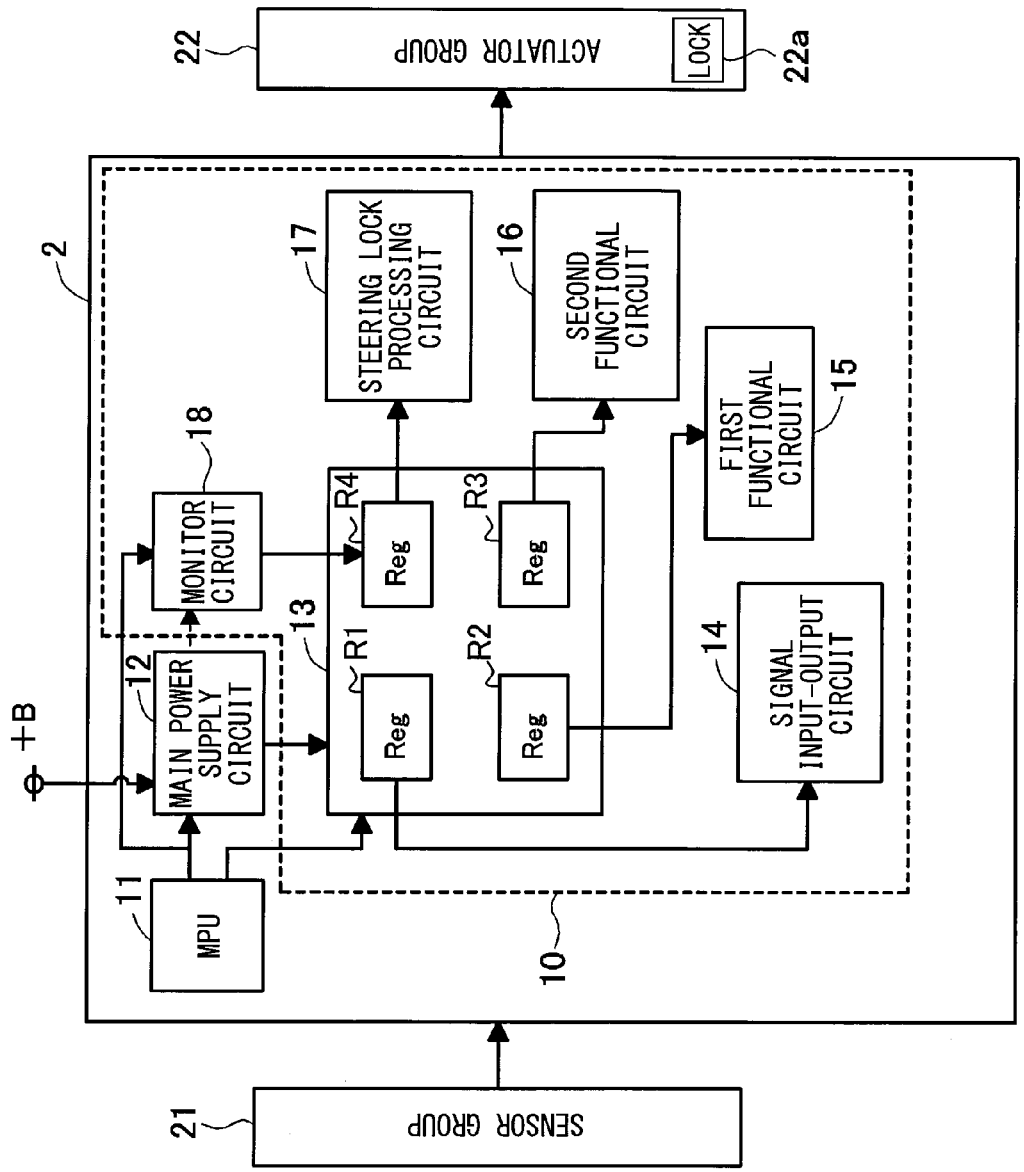
FIG. 1 is a block diagram of an electronic circuit according to a first embodiment of the present disclosure.

An electronic circuit according to a first embodiment of the present embodiment is described below with reference to the drawings. As shown in FIG. 1, an electronic circuit (hereinafter referred to as the "IC") 10 is included in an ECU 2, for example, together with a conventional MPU (Micro Processor unit) 11 and a main power source circuit 12. The ECU 2 obtains a state of a sensor group 21 which detects, for example, a vehicle state, the MPU 11 performs a predetermined calculation by executing a control program, and the electronic circuit 10 controls an actuator group 22, such as a motor, connected to the ECU 2 based on the calculation result.

The IC 10 is an integrated circuit separate from the MPU 11 and has a regulator circuit 13, including at least one regulator, and a functional circuit which executes a predetermined function by receiving power supply from the regulator. According to the present embodiment, the IC 10 has functional circuits including a signal input-output circuit 14, a first functional circuit 15, a second functional circuit 16, and a steering lock processing circuit 17. The IC 10 can be a conventional PDA (Personal Data Assistance).

The main power source circuit 12 supplies power to the components of the ECU 2 from an external power source (denoted by +B) such as a battery. At this time, the power is supplied by keeping the battery voltage (e.g., 12V) unchanged or by stepping down the battery voltage to a predetermined value, for example, 5V.

The regulator circuit 13 includes at least one conventional regulator. In an example shown in FIG. 1, regulators (abbreviated as Reg) R1, R2, R3, and R4 are included, and each regulator receives power from the main power source circuit 12 and performs power supply by converting it to an operation voltage (e.g., 3V) for a functional circuit connected to itself.

The signal input-output circuit 14 includes a waveform shaping circuit, an A/D conversion circuit, and a D/A conversion circuit, and a voltage conversion circuit. An output signal from the sensor group 21 is inputted to the signal input-output circuit 14. The inputted signal is subjected to waveform shaping and voltage conversion as needed and then A/D converted to a value (digital value) capable of being calculated in the MPU 11. Further, the signal input-output circuit 14 outputs a control signal, which is inputted from the MPU 11 or other functional circuits (15-17), to the actuator group 22.

Each of the first functional circuit 15 and the second functional circuit 16 performs a control process for a predetermined function to be controlled in the ECU 2 based on a command from the MPU 11. For example, a drive control signal for an actuator as a control target is outputted based on a state of a predetermined sensor.

The structure described above corresponds to a recitation that a functional circuit performs a predetermined calculation based on an input signal to the functional circuit and outputs a control signal to a control target (22) for the functional circuit based on a result of the calculation. This structure allows an adequate process for an external state to be always performed regardless of an operation mode of the electronic circuit.

Based on a state of the sensor group 21 (i.e., vehicle state signal), the steering lock processing circuit 17 outputs a signal (control signal in the present disclosure) indicative of whether power supply to a conventional steering lock device 22a (as to details of a steering lock device, refer to the patent literature 1, for example) included in the actuator group 22 is allowed or not.

The above structure corresponds to a recitation that a functional circuit serves as a steering lock processing circuit (17) for receiving a vehicle state signal indicative of a vehicle state and for outputting a control signal to a steering lock device (22a) based on the inputted vehicle state signal.

To make an operation of a steering lock device adequate, even during a transition of an electronic circuit from a sleep mode to a normal mode, a corresponding functional circuit (i.e., a steering lock processing circuit) is required to operate in the same manner as during the normal mode. The above structure can always perform an adequate process to the vehicle state regardless of an operation mode of the electronic circuit while ensuring responsivity.

A monitor circuit 18 monitors the operation mode outputted by the MPU 11 or the main power source circuit 12 and outputs a control signal indicative of whether a present operation state is maintained or not to a target regulator (R4) based on the operation mode.

According to the above structure, in the IC 10, the regulator circuit 13 receives power from the main power source circuit 12, and the functional circuits connected to the regulator circuit 13 operate the actuator group 22 based on the control command from the MPU 11 or the input signal from the sensor group 21, thereby achieving predetermined functions.

The operation mode of the ECU 2 includes a normal mode where a normal operation is performed and a sleep mode where power consumption is smaller than that in the normal mode. The operation mode switching is performed by the MPU 11. For example, when the MPU 11 outputs sleep transition information to the regulator circuit 13 so as to switch an operation mode of the functional circuit from the normal mode to the sleep mode, each regulator stops power supply (outputs 0V) or outputs a voltage lower than a normal supply voltage to the functional circuit connected to itself. Accordingly, each functional circuit stops its operation, or its operation mode transitions from the normal mode to the sleep mode.

The above structure corresponds to a recitation that operation mode information is inputted to a regulator circuit from a circuit (11) separate from an electronic circuit. This structure can allow the electronic circuit to have a simple structure, for example, a group of functional circuits alone.

Figure 2:
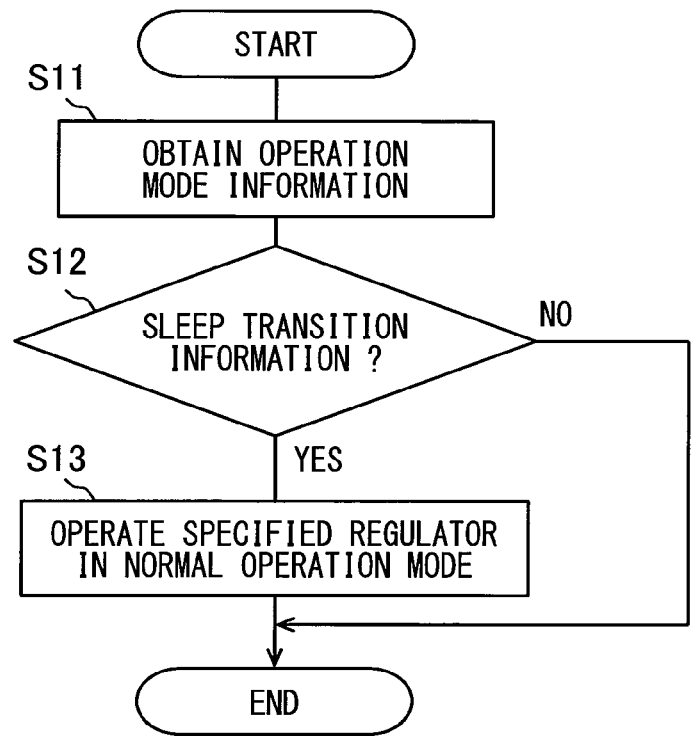
FIG. 2 is a flowchart to explain an operation of a monitor circuit.

An operation of the monitor circuit 18 is described with reference to FIG. 2. Firstly, operation mode information is obtained from the MPU 11 (S11). Then, if the obtained operation mode information contains the sleep transition information (S12: Yes), a signal (voltage output maintaining signal) to operate a designated regulator (R4 in the example of FIG. 1) in the same manner as in the normal mode is outputted (S13). That is, the regulator R4 is commanded to supply the same voltage as in the normal mode to the steering lock processing circuit 17.

Figure 3:
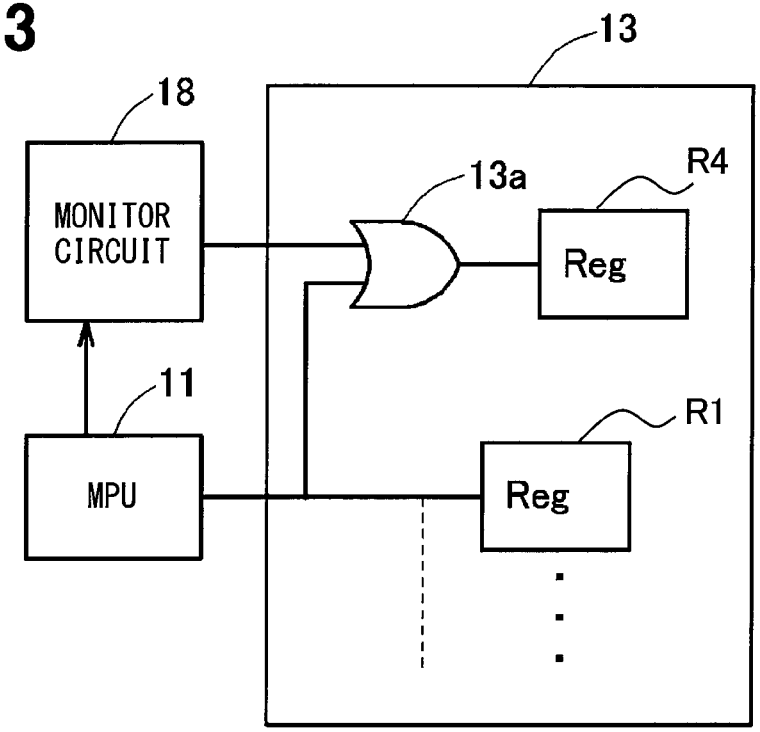
FIG. 3 is a diagram illustrating a detailed example of a structure of a regulator group.

FIG. 3 shows a detailed example of a structure of the regulator circuit 13. For example, the regulator circuit 13 has an OR circuit 13a interposed between the regulator R4 and the MPU 11 and the monitor circuit 18 so that it can output a logical OR between the operation mode information from the MPU 11 and the output from the monitor circuit 18. The other regulators (R1-R3) receive only the operation mode information from the MPU 11.

It is assumed here that the operation mode information is set to a H level when the normal mode is commanded, and set to a L level when the sleep mode is commanded. In this case, by supplying a H level to the regulator R4 when the monitor circuit 18 detects the sleep transition information (i.e., level change from H to L), the regulator R4 supplies the same voltage as in the normal mode. Thus, the steering lock processing circuit 17 operates in the normal mode regardless of the operation mode of the ECU 2. In this case, the monitor circuit 18 can include a logic inverter to inversely output the operation mode information from the MPU 11.

The above structure corresponds to a recitation that when operation mode information contains a content to command an operation to be performed in a normal mode, or when a monitor circuit outputs a voltage output maintaining signal, a regulator supplies the same voltage as in the normal mode to a functional circuit. According to this structure, functions of the present disclosure can be achieved by a simple structure.

An operation of a steering lock processing circuit 17 according to a prior art is described with reference to FIG.

Figure 4:
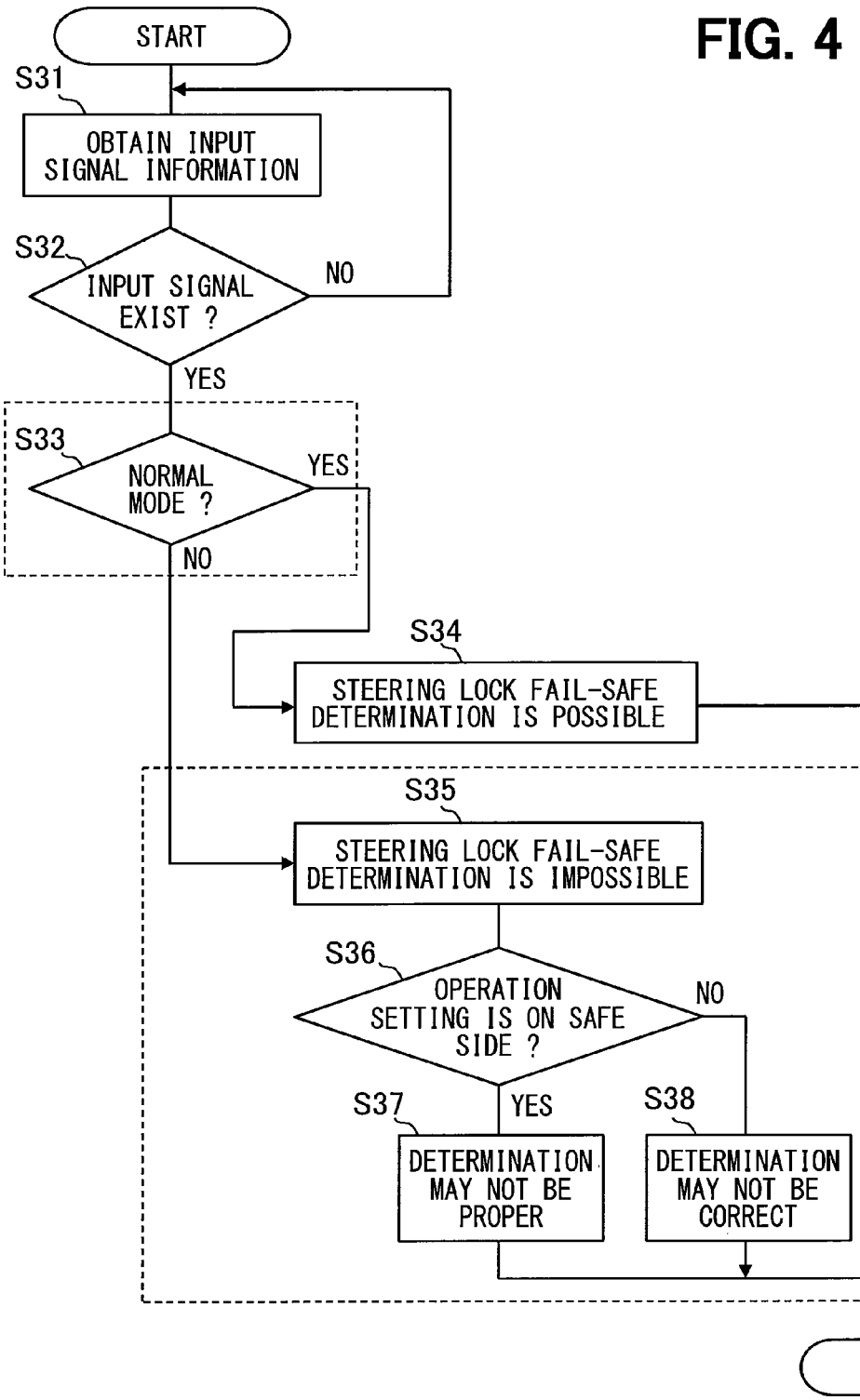
FIG. 4 is a flowchart to explain an operation of a steering lock processing circuit.

4. Firstly, input signal information (necessary for a steering lock process) from a sensor group 21 is obtained (S31). Then, if the steering lock processing circuit 17 (abbreviated as "circuit" in FIG. 4) is in a wake-up mode (i.e., normal mode) (S33: Yes) when an input signal exists or when a change in the input signal is detected (S32: Yes), a fail-safe determination of the steering lock can be performed.

In the fail-safe determination of the steering lock, it is determined whether power supply from an ECU 2 to a steering lock device 22a (refer to FIG. 1) included in the actuator group 22 is performed, it is determined whether power supply from another power source to the steering lock device 22a is allowed, or it is determined whether the steering lock device 22a is put in an operation condition, and a signal is outputted based on a result of the determination.

On the other hand, when the steering lock processing circuit 17 is in a transition from the sleep mode to the wake-up mode (S33: No), the fail-safe determination of the steering lock cannot be performed (S35) because the circuit does not operate normally.

At this time, if an operation setting is set to ensure safety in terms of a steering lock device (S36: Yes), such as putting a steering shaft in an unlocked state by default, i.e., putting the steering shaft in a locked state only when a predetermined condition is satisfied, or putting the steering shaft in the unlocked state when the steering lock processing circuit 17 is in an undefined state, there is no possibility that the steering shaft is put in the locked state against user's will. However, in this case, there is a possibility that the steering shaft may remain in the unlocked state when it is preferable that the steering shaft be put in the locked state. Thus, the determination and operation can be performed correctly, but may be performed inappropriately (S37). On the other hand, if the operation setting is not set in the above manner (S36: No), the determination and operation may be performed incorrectly (S38).

In contrast, according to the structure of the present disclosure, as described with reference to FIG. 2, since the steering lock processing circuit 17 always operates in the normal mode, the fail-safe determination of the steering lock can be performed during a period of time where power supply from the main power source circuit 12 continues. That is, steps S33 and steps S35 to S38 are not included in the structure.

Figure 5:
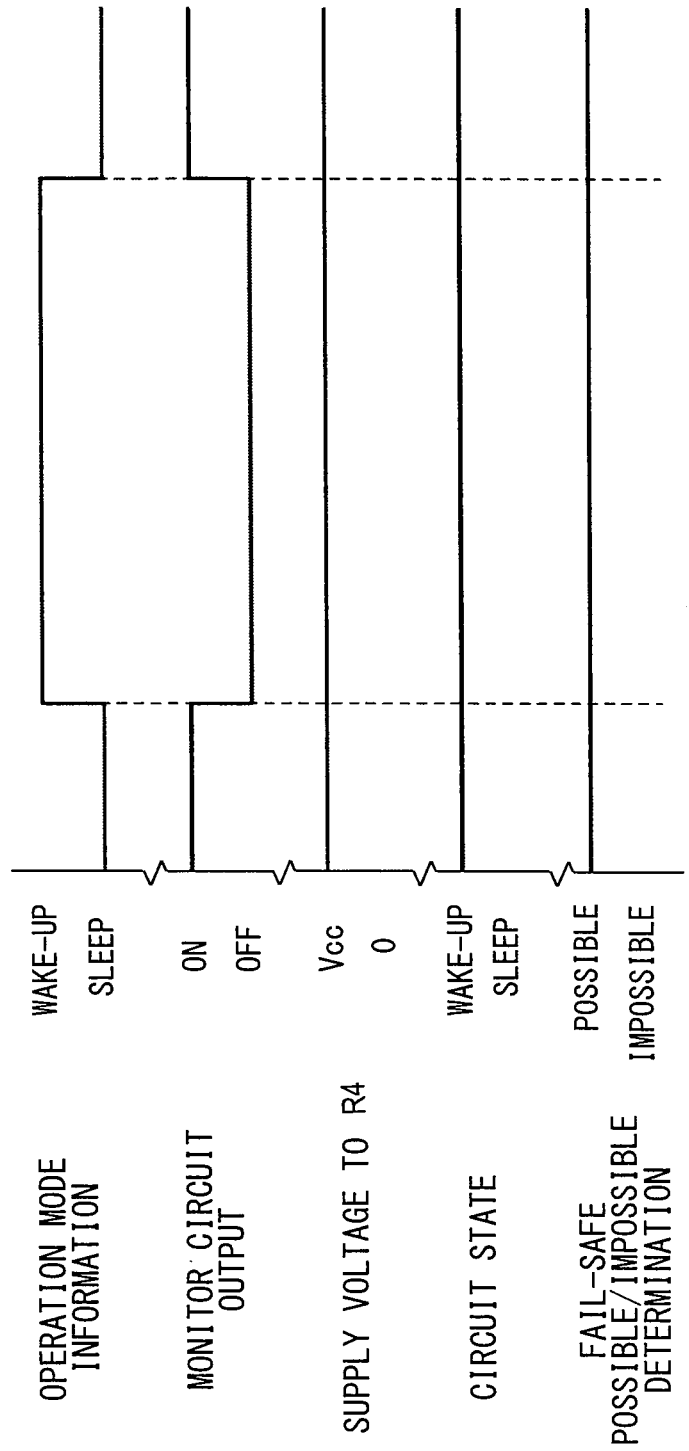
FIG. 5 is a timing diagram to explain an operation state of the electronic circuit according to the first embodiment of the present disclosure.

An operation of the electronic circuit 10 according to the present disclosure is described in detail with reference to FIGS. 5 and 6 by taking the steering lock processing circuit 17 as an example. FIG. 5 shows a timing diagram to explain an operation state of the structure according to the present disclosure, and FIG. 6 shows a timing diagram to explain an operation state of a structure according to a prior art.

Figure 6:
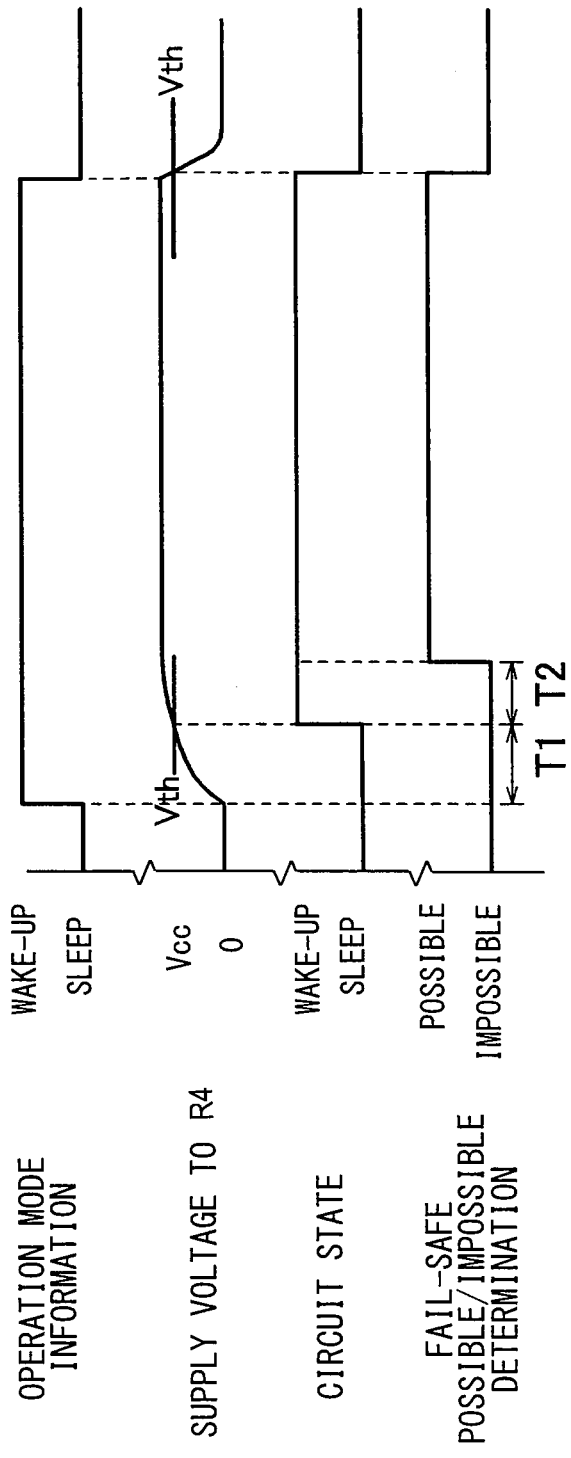
FIG. 6 is a timing diagram to explain an operation state of an electronic circuit according to a prior art.

Firstly, FIG. 6 is explained. When the operation mode information from the MPU 11 transitions from sleep (i.e., sleep mode) to wake-up (i.e., normal mode), this serves as wake-up transition information so that a supply voltage of the regulator R4 to the steering lock processing circuit 17 can gradually increase from 0 to a rated value Vcc. At this time, when the supply voltage of the regulator R4 exceeds a predetermined threshold value Vth, a state (circuit state) of the steering lock processing circuit 17 transitions from the sleep to the wake-up. Accordingly, an initialization process of the steering lock processing circuit 17 is performed, and then the steering lock processing circuit 17 operates in the normal mode and becomes capable of performing the fail-safe determination of the steering lock.

Further, when the operation mode information from the MPU 11 contains the sleep transition information indicative of the transition from the wake-up to the sleep, the supply voltage of the regulator R4 gradually decreases from the Vcc to 0. At this time, when the supply voltage of the regulator R4 decreases below the threshold value Vth, the state of the steering lock processing circuit 17 transitions from the wake-up to the sleep. After that, the steering lock processing circuit 17 operates in the sleep mode and becomes incapable of performing the fail-safe determination of the steering lock.

It is impossible to perform the fail-safe determination of the steering lock by obtaining the input signal information from the sensor group 21 during a time T1 and a time T2. The time T1 is from when the supply voltage of the regulator R4 starts to increase to when it exceeds the threshold value Vth. The time T2 is from when the state of the steering lock processing circuit 17 transitions from the sleep to the wake-up after the supply voltage of the regulator R4 exceeds the threshold value Vth to when the initialization process is finished (a state after step S35 in FIG. 5).

In contrast, in FIG. 5, when the operation mode information from the MPU 11 contains the sleep transition information, the monitor circuit 18 outputs an ON signal for causing the regulator R4 to operate in the normal mode. Thus, the supply voltage of the regulator R4 becomes the Vcc, and the state of the steering lock processing circuit 17 is in the wake-up. When the operation mode information from the MPU 11 contains the wake-up transition information, the monitor circuit 18 outputs an OFF signal, but the wake-up transition information becomes effective. Accordingly, the regulator R4 supplies the Vcc so that the state of the steering lock processing circuit 17 can becomes the wake-up.

After that, when the operation mode information from the MPU 11 contains the sleep transition information, the monitor circuit 18 outputs the ON signal, and the ON signal becomes effective. Accordingly, the supply voltage of the regulator R4 is maintained at the Vcc, and the state of the steering lock processing circuit 17 is maintained in the wake-up.

Alternatively, when the operation mode information from the MPU 11 contains the wake-up transition information, the monitor circuit 18 can output the ON signal. However, a structure that outputs the ON signal only when the sleep command is issued provides more safety because the MPU 11 alone can achieve control when the operation mode information from the MPU 11 contains information other than the sleep transition information or the wake-up transition information, or when a situation that don't want the steering lock device 22a to operate occurs.

While the present disclosure has been described with reference to the embodiments, it is to be understood that the disclosure is not limited to the embodiments. The present disclosure is intended to cover various modifications and equivalent arrangements inside the spirit and scope of the present disclosure.

What is claimed is:
1. An electronic circuit comprising:
a regulator circuit including a plurality of regulators configured to supply a predetermined voltage by receiving a power supply from a main power source circuit;
a plurality of functional circuits configured to operate on the voltage supplied from the regulators and perform predetermined functions, and a monitor circuit connected to at least one of the regulators and configured to monitor operation mode information inputted to the at least one of the regulators, wherein when detecting that the operation mode information contains sleep transition information to make a transition from a normal mode as a normal operation state to a sleep mode as an operation state where power consumption is smaller than that in the normal mode, the monitor circuit outputs a voltage output maintaining signal to the at least one of the regulators connected to the monitor circuit to supply the voltage capable of causing at least one of the functional circuits, which is connected with the at least one of the regulators, to operate in the normal mode, at least one of the functional circuits receives a signal, performs a predetermined calculation based on the signal, and outputs a control signal based on a result of the calculation to a target to be controlled by the functional circuits, and at least one of the functional circuits is configured as a steering lock processing circuit which receives a vehicle state signal indicative of a state of a vehicle and outputs the control signal based on the vehicle state signal to a steering lock device configured to lock a steering of the vehicle.

2. The electronic circuit according to claim 1, wherein the operation mode information is inputted to the regulator circuit from a circuit separate from the electronic circuit.

* * * * *